Sept. 20, 1966  J. W. MADDOX  3,274,373
STEAM DRAIN AND REHEAT DEVICE
Filed Sept. 10, 1963  2 Sheets-Sheet 1

INVENTOR
JAMES W. MADDOX
BY *Shoemaker and Mattare*
ATTORNEYS

Sept. 20, 1966  J. W. MADDOX  3,274,373
STEAM DRAIN AND REHEAT DEVICE
Filed Sept. 10, 1963  2 Sheets-Sheet 2

INVENTOR
JAMES W. MADDOX

BY Shoemaker and Mattare
ATTORNEYS

United States Patent Office 3,274,373
Patented Sept. 20, 1966

3,274,373
STEAM DRAIN AND REHEAT DEVICE
James W. Maddox, Newport News, Va., assignor to Newport News Shipbuilding and Dry Dock Company, Newport News, Va., a corporation of Virginia
Filed Sept. 10, 1963, Ser. No. 307,860
10 Claims. (Cl. 219—272)

This invention relates to drain devices, and more particularly to devices adapted to be connected to the low point of a steam line or other steam containers so as to collect the liquid condensate therefrom, reheat the condensate so as to reconvert it into steam and return it to the steam line or steam container.

It is conventional practice to remove condensate from steam lines by devices which conduct the condensate from low points in the steam line to depositories of lower pressure. These devices are quite complex and expensive since they usually consist of a single tap line branching into two lines, one of these lines containing two valves, a funnel, and, if connected to a waste drain main, a check valve. The other line normally leads to a high pressure drain main and contains a cut-out valve, a steam trap, a tell-tale valve, and a stop check valve. The traps, valves and piping of these conventional devices are subject to rapid wear due to the action of moving parts and are subject to early erosion and corrosion due to water particles in the steam, expansion due to heat and the high velocity of the steam and water particles therein.

Accordingly, it is a primary object of this invention to provide a device for collecting condensate from a steam line or other container and to convert this condensate into steam and to return this steam to the steam line or container, and which device is much more simple, is more economical to manufacture and maintain, and is more reliable in use than conventional drain devices for removing condensate from steam lines.

It is another object of this invention to provide a device for returning condensate to a steam line in the form of steam which is automatically operated in response to a predetermined level of liquid within the device, but also may be manually operated.

It is another object of this invention to provide a device for collecting condensate from a steam line, heating the condensate and returning it to the steam line in the form of steam, and which is provided with a novel baffle means for separating the incoming liquid condensate from the outgoing steam so as to prevent the outgoing steam from being contaminated with liquid particles.

It is yet another object of this invention to provide a device for converting liquid condensate into steam by means of a plurality of vertically spaced heating elements and the heating elements are controlled so that normally only the lowermost heating elements are used and the uppermost heating elements are used or energized only when the liquid condensate level rises a predetermined distance above the lowermost heating elements.

The invention will be best understood from a consideration of the following detailed description taken in connection with the accompanying drawings, wherein.

Figure 1:
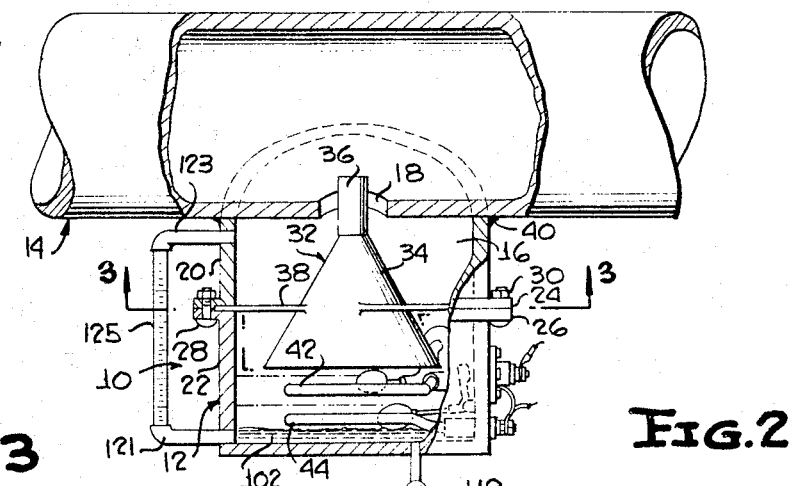
FIG. 1 is an elevational view of the invention with parts broken away.
Figure 3:
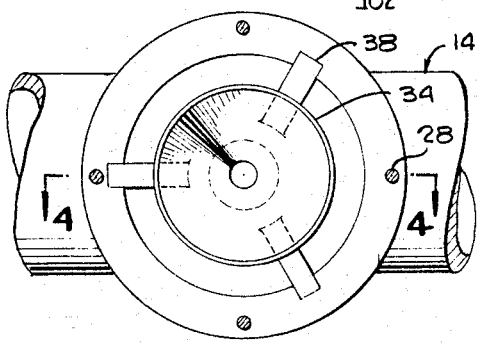
FIG. 3 is a cross sectional view taken substantially on the plane of line 3—3 in FIG. 1.

As shown in the drawings, and particularly FIGS. 1 and 3, the drain device 10 includes a receptacle 12 connected to the lowest point of a steam line or other vapor container 14. The receptacle 12 encloses a chamber 16 which communicates with the interior of steam line 14 by means of an aperture 18 in the bottom of or at the lowest point in the steam line. Except for aperture 18, chamber 16 is completely sealed.

Receptacle 12 is of a suitable size and shape, and as illustrated, comprises a cylindrical or tubular adaptor 20 and pot or housing 22 each having integral abutting annular flanges 24 and 26 which are removably secured together by a plurality of bolts 28 extending through aligned apertures in the flanges and nuts 30 threaded onto the bolts so as to urge the flanges tightly together in sealing relationship.

A suitable baffle 32 is provided in the upper portion of chamber 16, and as illustrated, the baffle comprises an inverted funnel having a frusto-conical body 34 secured to a tubular extension 36 which extends through and above aperture 18 in spaced relation to the edges of the aperture. Body 34 is provided with a plurality of integral coplanar and radially extending arms 38 which terminate within grooves or recesses formed between flanges 24 and 26 whereby the arms removably support the baffle in concentric relation to the axis of chamber 16. The upper edges of adaptor 20 are secured in sealing relationship to steam line 14 by means of welds 40.

Figure 4:
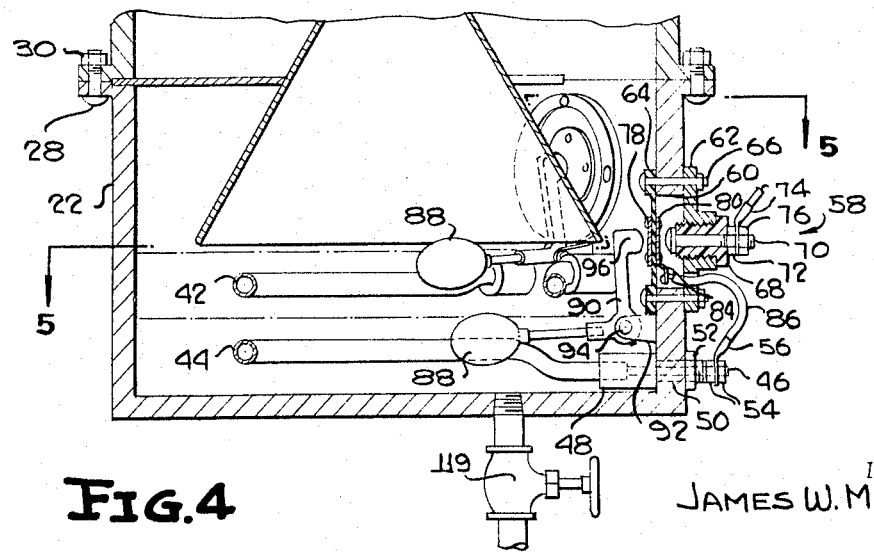
FIG. 4 is an enlarged cross sectional view taken substantially on the plane of line 4—4 of FIG. 3.
Figure 5:
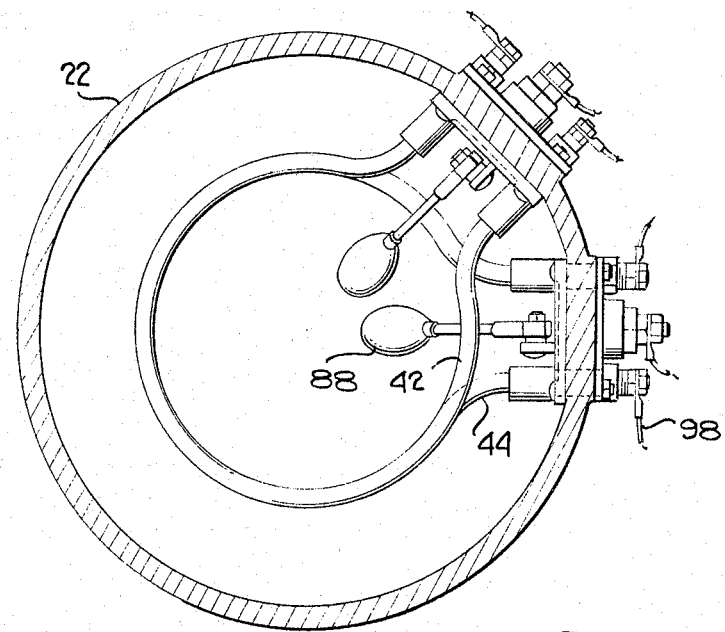
FIG. 5 is a cross sectional view taken substantially on the plane of line 5—5 of FIG. 4.

Suitable heating means are provided in chamber 16 below baffle 32. As illustrated, the heating means comprises a plurality of vertically spaced electrical resistors 42 and 44 of substantially circular or horseshoe shape. The resistors may be of tubular construction and the ends thereof receive conductive studs 46 which may be threaded within the ends of the tubular conductors. The mating ends of the resistors and studs are imbedded within a sleeve 48 composed of insulating material and having a reduced end 50 which extends through a suitable bore in the wall of housing 22 and has a nut 52 threaded on its outer end so as to securely clamp the sleeve to housing 22 whereby the sleeve at each of the ends of each conductor support the conductor in a horizontal position as illustrated in FIG 4. The free end of each stud 46 also has a pair of nuts 54 threaded thereon so as to clamp therebetween an electrical terminal 56 which is connected to a wire or conductor for connecting the resistor to a source of electricity.

Figure 2:
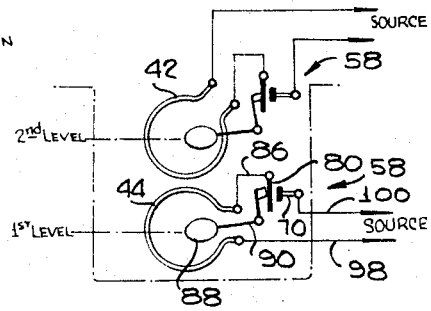
FIG. 2 is a diagrammatic view of the heating elements and electrical circuit employed with the device in FIG. 1.

Each of the resistors 42 and 44 are connected to a source of electricity by a liquid level responsive means. As illustrated in FIGS. 1, 2, and 4, the liquid level responsive means comprises a pair of float operated switches 58. Each switch includes an opening 60 through the side of housing 22, a mounting plate 62 extending over the outside of the opening and a flexible diaphragm 64 extending over the inside of the opening and composed of an insulating material such as rubber or plastic. Diaphragm 64 and plate 62 are secured over opening 60 so as to effectively seal same by a plurality of nut and bolt assemblies 66 extending through aligned apertures in the diaphragm, plate and wall of housing 22. A tubular plug 68 composed of insulating material is coaxially threaded through a bore formed through the center of plate 62, and a contact comprising a bolt 70 extends through the center of plug 68 and secured thereto by a nut 72. A wire or conductor is also connected to bolt 70 by means of a suitable electrical terminal or fitting 74 secured to the bolt by means of a second nut 76.

A switch contact comprising plate and an abutment plate 78 are secured to opposite sides of diaphragm 64 at the center thereof by means of rivets or cement. Plate 80 has a radially extending offset lug 84 which is connected to one end of one of the resistor elements by means of a suitable conductor or wire 86.

Each switch 58 is provided with an operator comprising a float 88 mounted on one end of an L-shaped bell crank lever 90 which is pivotally mounted at its center or apex to the interior surface of housing 22 by means of an ear 92 and pivot pin 94. The other or upper end of lever 90 terminates in a lug 96 adjacent plate 78.

As shown in FIG. 2, one end of each resistor 42 or 44 is connected to a suitable source of electricity by a conductor 98 and the other end is connected to the source by conductor 100, conductor 86, and a switch 58 connected in series with the conductors 86 and 100.

In operation, the chamber 16 receives through the opening 18 condensate 102 which condenses from the vapor or steam within the container or steam line 14. This liquid condensate falls upon the exterior of baffle 32 and drains into the bottom of receptacle 12. As the level of the condensate within chamber 16 of housing 22 rises, it causes the lowermost float 88 to also rise and pivot its bell crank lever 90 in a clockwise direction as viewed in FIG. 4, so as to urge the lug 96 against plate 78 which, in turn, urges plate 80 towards contact 70. When the liquid level reaches the resistor 44, the lowermost float 88 and lever 90 urge contact 80 into engagement with contact 70 so as to close the lowermost switch 58 and supply electric current to the resistor 44. Due to the flow of current therethrough, resistor 44 becomes heated thereby causing the accumulated condensate 102 to vaporize or form steam which passes upwardly through the interior of baffle 32 and back into steam line or container 14. Baffle 32 effectively separates the incoming liquid condensate and the outgoing vapor or steam so as to prevent the steam from becoming saturated or contaminated with drops of liquid condensate. In the event that liquid condensate is flowing into chamber 16 faster than the resistor 44 can vaporize it, the liquid level rises thereby causing the uppermost float 88 to rise and to energize the upper resistor 42 in a similar manner in which the resistor 44 is energized. When the liquid level again recedes below the resistor 42, the uppermost float 88 falls and thereby causes resistor 42 to become de-energized. Although only two resistors are illustrated, it is apparent that three or more vertically spaced resistors could be used within chamber 16 if desired.

Figure 6:
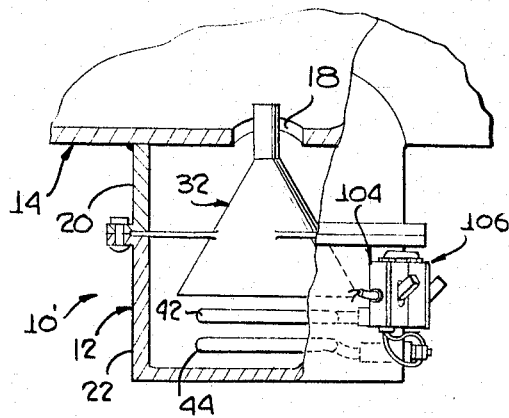
FIG. 6 is an elevational view with parts broken away of a modified form of the invention.

The drain device 10' illustrated in FIG. 6 is similar in construction to the device 10 illustrated in FIGS. 1 through 5, and like parts have the same reference numerals. The primary difference between the device 10 and the device 10' is that in the device 10', the float operated switches 58 have been omitted and manually operated switches 104 and 106 have been substituted therefor.

Figure 7:
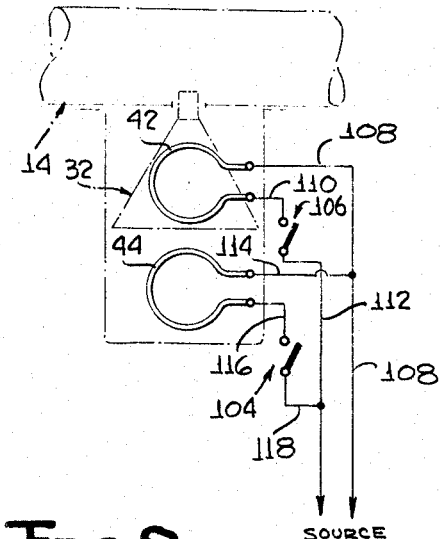
FIG. 7 is a diagrammatic view of the heating elements and electrical circuit employed with the form of the invention illustrated in FIG. 6.

As shown in FIG. 7, one end of the resistor 42 is connected to a source of electricity by a conductor 108 and the other end of the resistor is connected to the source by switch 106 connected in series with conductors 110 and 112. One end of the resistor 44 is connected to the source of electricity by a conductor 114 and conductor 108 while the other end of the resistor is connected to the source by manually operated switch 104 connected in series with conductors 116 and 118.

When steam or vapors are within container 14, switch 104 is normally maintained in a closed position so that resistor 44 will be continuously energized for vaporizing all the liquid condensate that flows through opening 18 from container 14. However, in case of failure or malfunction of the resistor 44, or in the event that the resistor 44 is unable to vaporize the liquid condensate at a sufficient rate, the switch 106 is closed for energizing the resistor 42 so that the liquid condensate may be vaporized at a faster rate. Also, the resistor 42 may be energized for superheating or improving the quality of the vapor produced by the resistor 44.

Figure 8:
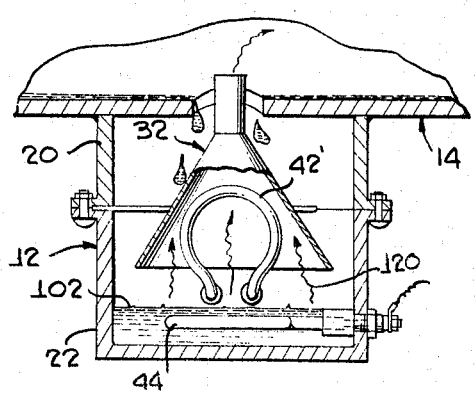
FIG. 8 is a vertical cross sectional view of another modified form of the invention.

The form of the invention shown in FIG. 8 is similar to that shown in FIGS. 1 through 7 and identical parts are identified with the same reference numerals. In the form of the invention shown in FIG. 8, the resistor 42' is deflected vertically upwardly into the baffle 32. The resistors 44 and 42' may be energized by manual, float operated, or other suitable switches. However, in use, it is preferable that the resistor or heating element 42' always be energized at the same time as the heating element 44 so that the vapors or steam 120 produced by the heating elements 44 will not only flow up into the baffle 42' whereby the vapors will be further heated or superheated so as to improve the quality thereof.

As illustrated in FIGS. 1 and 4, a drain conduit may be connected to the bottom of housing 22. This drain conduit includes a conventional cut-off valve 119 which may be opened whenever it is desired to drain fluid from the housing 22. Of course, the forms of the invention shown in FIGS. 6 and 8, may also be provided with a similar drain conduit and cut-off valve. The drain conduit and cut-off valve 119 permits disposal of heavy condensate flow during initial warm up of the piping system in the event the electrical resistors 42 and 44 are unable to vaporize this flow at a sufficiently rapid rate. The drain conduit and cut-off valve also may be used as an emergency drain in case of failure of the heater elements, and they also facilitate more rapid decompression during system shut down.

As illustrated in FIG. 1, the receptacle 12 may be provided with a device for indicating the level of liquid within chamber 16. This device may comprise a vertically extending transparent conduit 125 having its upper end connected to the upper portion of receptacle 12 by conduit 123 and its lower end connected to the bottom of the receptacle by a conduit 121. The transparent conduit 125 may contain graduated markings thereon for indicating the level of liquid within case 12. By visually observing the liquid within the transparent conduit 125, the operator may easily determine when it is necessary to drain the chamber 16 by means of valve 119, or when the heating elements are not properly functioning.

Inasmuch as various changes may be made in the form, location and relative arrangement of the several parts without departing from the essential characteristics of the invention, it will be understood that the invention is not to be limited except by the scope of the appended claims.

I claim:

1. A liquid heating and vaporizing device comprising a closed bottom receptacle having its upper end open and adapted to be connected to and in communication with the low point of a vapor container, said receptacle comprising upper and lower sections, joined in a hermetically sealed joint, an open ended conical baffle in said receptacle, means supporting said baffle in spaced relation to the bottom and sides of the receptacle, said means including radially extending arms on said baffle, the ends of which are secured to the sides of the receptacle at said joint, and electrically controlled heating and vaporizing means positioned in said receptacle beneath the said baffle and substantially within the vertical projection of the peripheral lower edge thereof.

2. A liquid heating and vaporizing device comprising a closed bottom receptacle, having its upper end open and the edge thereof curved to fit the cylindrical surface of a steam pipe having a drain opening therein, said receptacle comprising upper and lower sections, joined in a hermetically sealed joint, an open ended conical baffle in said receptacle, means supporting said baffle in spaced relation to the bottom and sides of the recptacle, said means including radially extending arms on said baffle, the ends of which are secured to the sides of the receptacle at said joint, and electrically controlled heating and vaporizing means positioned in said receptacle beneath said baffle and substantially within the vertical projection of the peripheral lower edge thereof.

3. In combination a steam line and a receptacle connected to the low point of the steam line and in communication therewith so as to receive liquid condensate therefrom, heating means within said receptacle for heating and vaporizing said condensate and returning it to said steam line in the form of vapor, and baffle means in said container above said heating means for separating the condensate entering the said receptacle from the vapor leaving said receptacle, said baffle means comprising an inverted funnel.

4. In combination a steam line and a receptacle connected to the low point of the steam line and in communication therewith so as to receive liquid condensate therefrom, heating means within said receptacle for heating and vaporizing said condensate and returning it to said steam line in the form of vapor, and baffle means in said container above said heating means for separating the condensate entering the said receptacle from the vapor leaving said receptacle, said baffle means comprising an inverted funnel, and said heating means comprising two electrical resistors spaced one above the other, the uppermost resistor extending vertically upwardly into said funnel so as to increase the temperature of the vapor passing therethrough.

5. In combination a steam line and a receptacle connected to the low point of the steam line and in communication therewith so as to receive liquid condensate therefrom, heating means within said receptacle for heating and vaporizing said condensate and returning it to said steam line in the form of vapor, and baffle means in said container above said heating means for separating the condensate entering the said receptacle from the vapor leaving said receptacle, said baffle means comprising an inverted funnel, said heating means comprising two electrical resistors spaced one above the other, the uppermost resistor extending vertically upwardly into said funnel so as to increase the temperature of the vapor passing therethrough, and a float operated switch connected in series between each of said resistors and a source of electricity, said float operated switches adapted to energize said resistors successively as the liquid rises in said receptacle.

6. A liquid heating device comprising a closed bottom receptacle having opening means therein at its upper end adapted to be connected to the low point of a vapor container whereby condensed vapors may flow from said vapor container into said receptacle, means within the receptacle baffling the incoming condensed vapors toward the sides of the receptacle, and heating means within said receptacle adapted to heat and vaporize said condensed vapors into fresh vapors so that said fresh vapors may be returned through said opening means to said container, said baffle means being above said heating means and including a conical baffle with an opening at its upper end adapted to separate said condensed vapors entering said receptacle from said fresh vapors leaving said receptacle.

7. In combination, a vapor container having a drainage opening at a low point thereof, a sealed receptacle hermetically joined to said container about said opening, said receptacle having a chamber therein in communication with said opening whereby liquid comprising condensed vapors may flow from said vapor container into said chamber, means for baffling the flow towards the sides of the receptacle, electric heating means in the bottom of said chamber for vaporizing said liquid into vapor, whereby said vapor may flow into said container, said chamber and heating means being directly below said opening, and said baffle means comprising an inverted funnel completely covering said heating means and extending through said opening.

8. In combination a steam line having a low point with an opening therein and a device for vaporizing liquid condensate, said device comprising a closed bottom receptacle having its top portion hermetically connected to the low point of said steam line about said opening so as to receive liquid condensate therefrom through said opening and accumulate liquid therein to different levels; separate and independently controlled heating units positioned at different levels within said receptacle for heating and vaporizing said condensate so that it may be returned to said steam line in the form of vapor, and means positioned in said receptacle over said heating units and beneath said opening for diverting the incoming liquid toward the sides of the receptacle and for returning the vaporized liquid to the steam line through the said opening.

9. In combination a steam line having a low point with an opening therein and a device for vaporizing liquid condensate, said device comprising a closed bottom receptacle having its top portion hermetically connected to the low point of said steam line so as to receive liquid condensate therefrom through said opening and accumulate liquid therein, a controlled heating unit positioned within said receptacle for heating and vaporizing said condensate so that it may be returned to said steam line in the form of vapor and baffle means in said receptacle beneath said opening separating the condensate entering the said receptacle from the vapor leaving said receptacle, said baffle means further including means for delivering said vapor to said steam line through said opening.

10. In combination, a steam line having an opening in the low point thereof, a liquid heating device connected to said steam line at said low point, said heating device comprising a closed bottom receptacle having opening means therein at its upper end and connected to said steam line at said low point and depending therefrom whereby condensed vapors may flow from said steam line through said opening into said receptacle, baffle means in the upper portion of said receptacle beneath said opening, said baffle means comprising a downwardly sloping plate means having a central opening, said opening being axially aligned with the opening in the steam line and of less diameter, and heating means within said receptacle beneath said baffle means adapted to heat and vaporize the condensed vapors into fresh vapors and return them to the steam line through said central opening in said baffle means, and said heater being electrically controlled by the water level in said closed bottom receptacle.

References Cited by the Examiner

UNITED STATES PATENTS

| | | | |
|---|---|---|---|
| 1,158,586 | 11/1915 | Thornton | 219—333 |
| 1,276,573 | 8/1918 | Rohan | 219—341 |
| 1,625,989 | 4/1927 | Duffie | 219—341 |
| 1,887,533 | 11/1932 | Williams | 219—341 |
| 1,913,923 | 6/1933 | Freeman | 219—341 X |
| 2,266,016 | 12/1941 | Fisher | 219—341 |
| 2,464,013 | 3/1949 | Willis | 219—333 X |
| 2,663,787 | 12/1953 | Alexander | 219—316 |

FOREIGN PATENTS 490,683    1/1919    France.

RICHARD M. WOOD, *Primary Examiner.*

ANTHONY BARTIS, *Examiner.*

C. L. ALBRITTON, *Assistant Examiner.*